United States Patent [19]

Cannon et al.

[11] 4,014,451
[45] Mar. 29, 1977

[54] BREAD PAN FOR BAKING MINIATURE LOAVES

[75] Inventors: Sidney E. Cannon; Billy M. Keith; Charles E. Cannon; Joseph H. Caldwell, all of Dallas, Tex.

[73] Assignee: Campbell Taggart, Inc., Dallas, Tex.

[22] Filed: Nov. 3, 1975

[21] Appl. No.: 628,394

[52] U.S. Cl. .............................. 220/20.5; 249/130; 220/22

[51] Int. Cl.² ....................................... B65D 85/00

[58] Field of Search .................. 220/23.2, 20.5, 22; 249/130, 131, 132

[56] References Cited

UNITED STATES PATENTS

| 1,228,471 | 6/1917 | Mueller | 220/23.2 X |
| 3,120,112 | 2/1964 | Davis | 249/130 X |
| 3,374,982 | 3/1968 | Sallade | 249/129 X |

Primary Examiner—William Price
Assistant Examiner—Steven M. Pollard
Attorney, Agent, or Firm—Howard E. Moore

[57] ABSTRACT

A bread pan for baking a plurality of joined miniature loaves of bread, each pan having spaced upwardly extending dividers therein to divide the pan into sections, each divider having a recess formed along the upper edge thereof. A lid is provided which comprises a frame adapted to fit over the edges of the pan with a plurality of transverse spacer members therein aligned over the dividers with a downwardly extending portion thereof extending into each recess and terminating short of the bottom thereof leaving a space to form a pull-apart joinder between the miniature loaves of bread along the bottom lengthwise edge of each loaf. The upper edges of the spacers extend above the baking compartments to prevent the dough from contacting while the loaves are being baked, thereby providing a plurality of miniature pull-apart loaves of uniform shape and weight.

13 Claims, 9 Drawing Figures

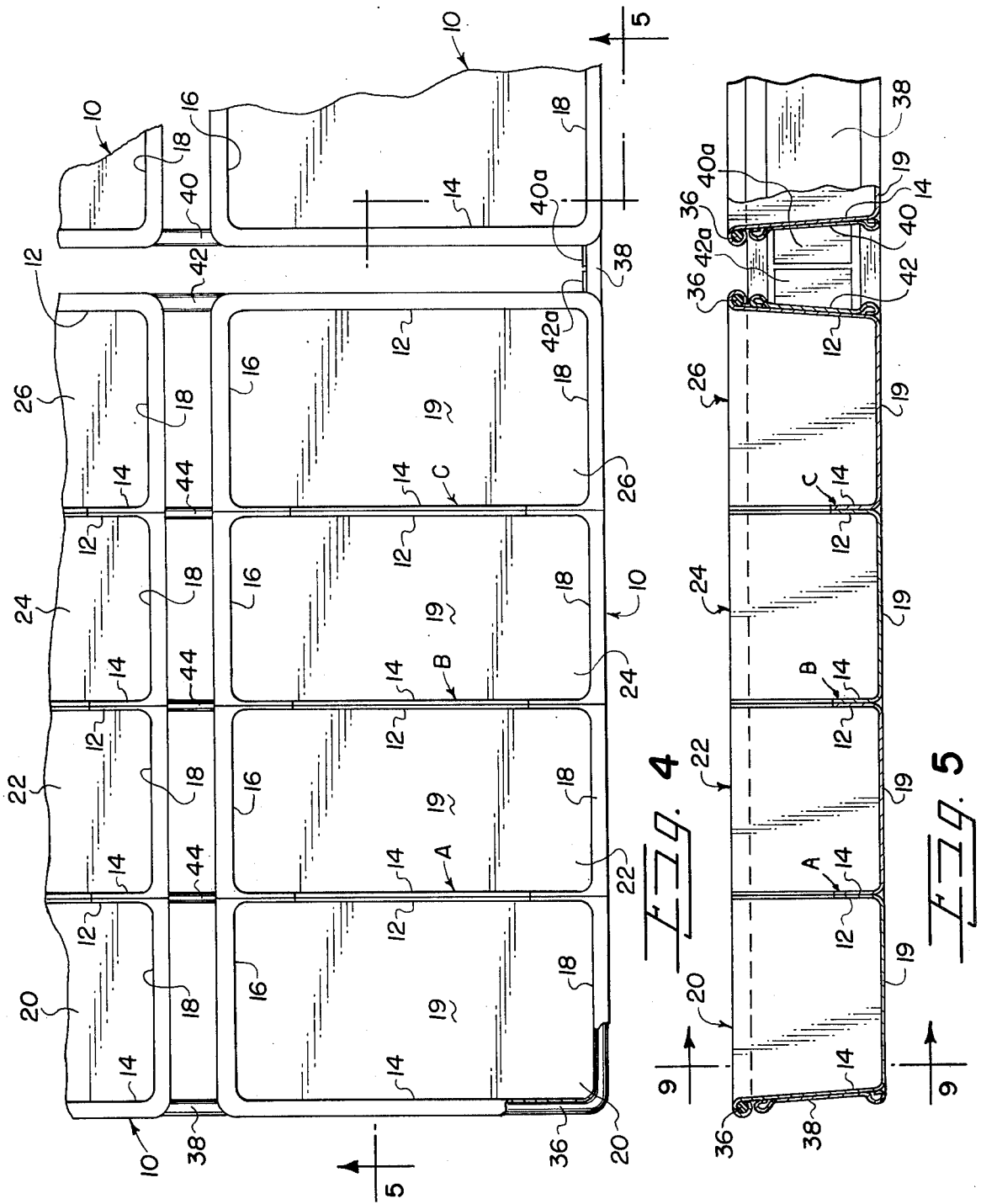

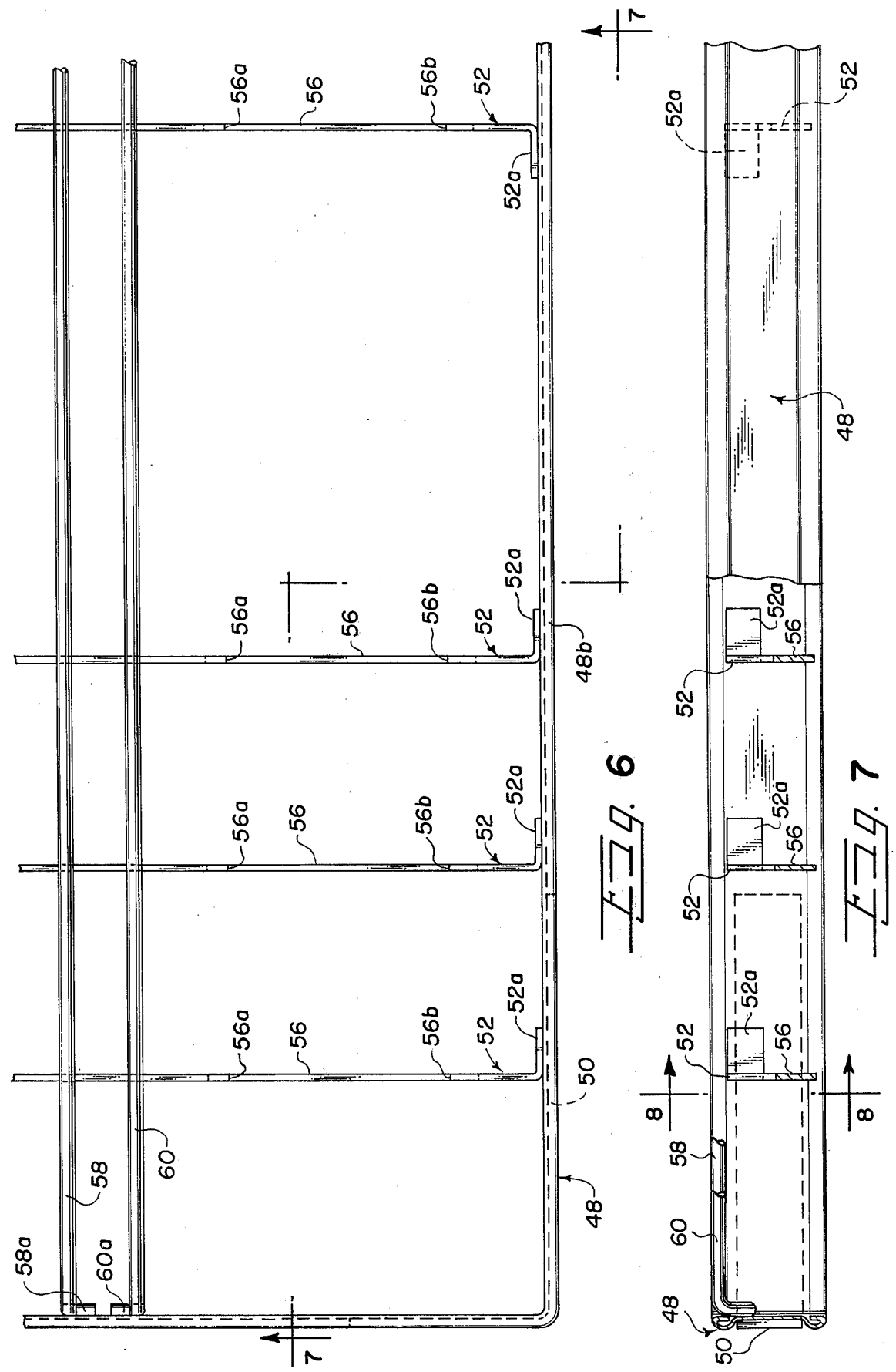

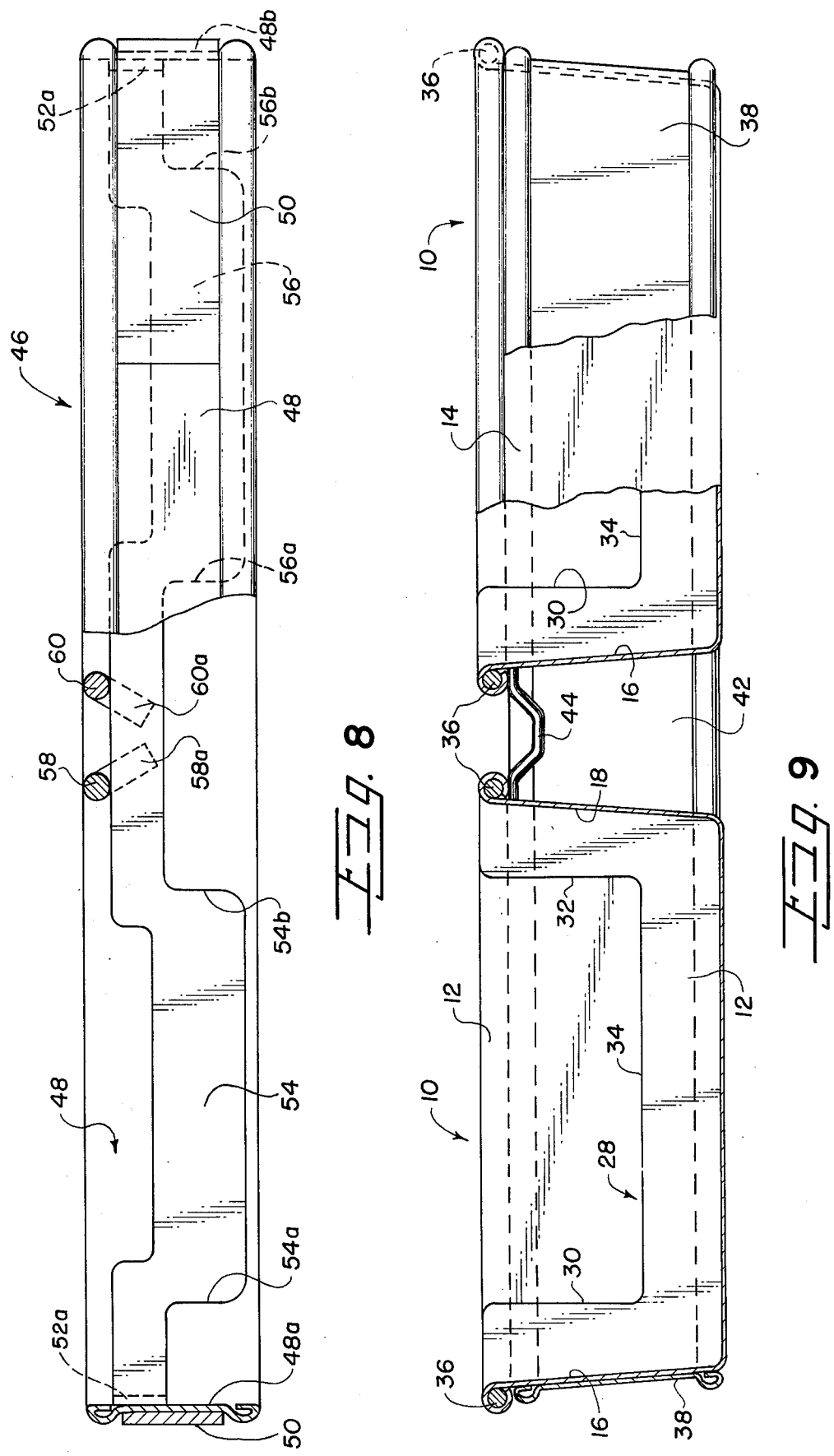

BREAD PAN FOR BAKING MINIATURE LOAVES

BACKGROUND

In many of the states there are laws which restrict the weight of a loaf of bread to approximately 16 ounces in order to be sold. In order to sell miniature loaves of bread weighing less than 16 ounces each the loaves must be joined together to comply with the various state laws which require a minimum of sixteen ounces of bread per loaf.

In such event it is desirable that the individual miniature loaves be joined but in such a manner that they may be broken apart easily without mashing the adjacent loaf or tearing the bread irregularly so that each miniature loaf may be individually sliced and served.

Heretofore pull-apart sections of bread have been scored along the top by wires which merely marked the bread for tearing. However, the score mark is not sufficiently deep to produce a uniform tear of the bread away from the adjoining section so that the sections may be of uniform weight and dimensions when pulled apart. In addition, a crust was not formed between the divisions of the scored bread loaves which is desirable in miniature loaves of bread.

SUMMARY OF THE INVENTION

A bread pan for producing miniature loaves of bread having spaced upwardly extending partitions in said pan to divide the pan into sections, with a recess formed in the upper edge of each divider. A lid is comprised of a frame adapted to fit over the bread pan, having spaced transverse dividers secured across the frame in alignment with the partitions in the pan such that the downwardly extending portion thereof extends into the recess of the divider but is spaced from the bottom thereof, leaving a passage between each section of the bread pan. The bread is joined lengthwise along the partition by the dough extending through the passages so as to provide a loaf of bread weighing not less than sixteen ounces made up of pull-apart sections.

A primary object of the invention is to produce miniature loaves of bread which are joined by a web portion therebetween to provide a large loaf of bread weighing approximately sixteen ounces.

A further object of the invention is to produce a loaf of bread which will comply with various state laws yet will consist of a plurality of joined miniature sections which are completely baked and crusted on the top edges ends and bottoms thereof and joined only by a narrow web between the lengthwise edges of the miniature loaves.

A further object of the invention is to produce a plurality of miniature loaves of bread which are joined by a thin web at the edges and are easily separable into sections of uniform dimensions and weight.

DESCRIPTION OF THE DRAWINGS

Drawings of a preferred embodiment are annexed hereto so the invention may be better and more fully understood, in which:

FIG. 4 is an enlarged fragmentary plan view of a typical bread pan made in accordance with the invention;

FIG. 5 is a cross-sectional view taken along line 5—5 of FIG. 4;

FIG. 6 is an enlarged fragmentary plan view of the lid;

FIG. 7 is a cross-sectional view taken along line 7—7 of FIG. 6;

FIG. 8 is a cross-sectional end view taken along line 8—8 of FIG. 7; and

FIG. 9 is a cross-sectional end view taken along line 9—9 of FIG. 5.

Numeral references are employed to designate parts shown in the drawing and like numerals are used to designate like parts throughout the various figures of the drawings.

DESCRIPTION OF A PREFERRED EMBODIMENT

Figure 1:
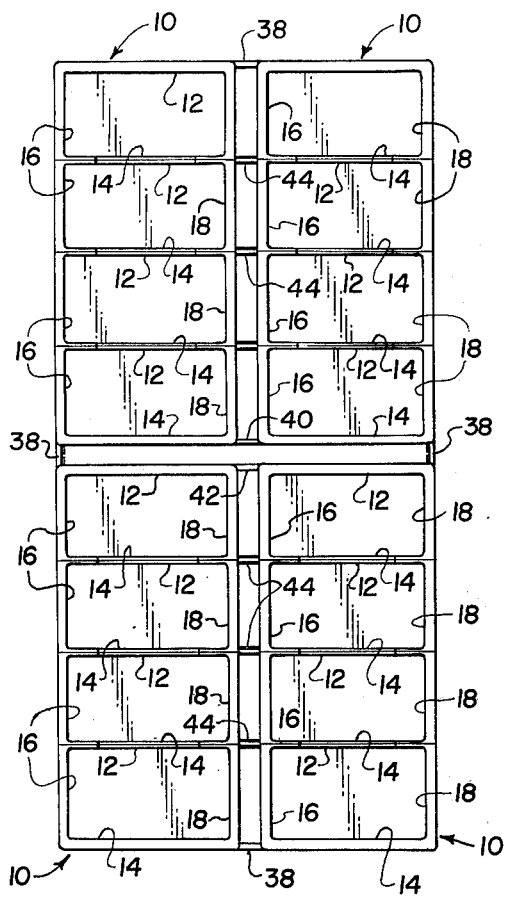
FIG. 1 is a plan view of a four-loaf bread pan wherein each loaf is divided into four uniform pull-apart sections.

Referring to FIG. 4 of the drawings, numeral 10 generally designates a loaf pan for baking miniature loaves of bread joined together to form a large loaf of bread of a predetermined weight, such as sixteen ounces.

The loaf pan 10 comprises a plurality of baking compartments or pan sections each having sidewalls 12 and 14 and end walls 16 and 18 joined by bottom 19. As best illustrated in FIG. 5, the pan sections 20, 22, 24 and 26 are joined along a common divider wall or partition generally designated A, B and C, forming a single large pan 10. Each of the walls A, B and C between sectioned pans 20 and 22, 22 and 24, and 24 and 26 has a cutout portion, forming a recess 28 in the upper edge thereof, as best illustrated in FIG. 9. The recess 28 has edges 30 and 32 extending downwardly joined by a web 34 formed by the adjoining sidewalls 14 and 16.

Each of the tops of pan 10 are rolled along the exterior edges about a reinforcing rod 36 to provide strength. The pans 10 should be constructed of heat resistant materials such as metal and may be coated with materials to prevent sticking of the bread therein, if desired.

As illustrated in the preferred embodiment, a plurality of loaf pans 10 may be joined together by metal bands 38 formed about the exterior of the four pans 10, as illustrated in FIG. 1, and rigidly secured thereto by welding or the like.

Cross-bands 40 and 42, as illustrated in FIGS. 1, 4 and 5 have ends 40a and 42a secured to bands 38 and rigidly secured to the ends of loaf pans 10, spacing the pans apart to provide even heat distribution. Additional support bars 44 are rigidly secured between end walls 16 and 18 of each sectioned pan.

Figure 2:
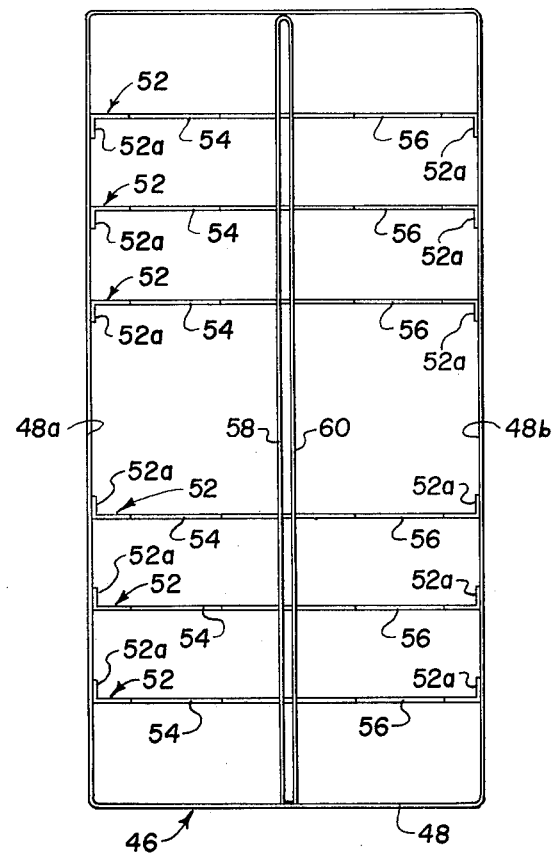
FIG. 2 is a plan view of a four-loaf lid.
Figure 3:
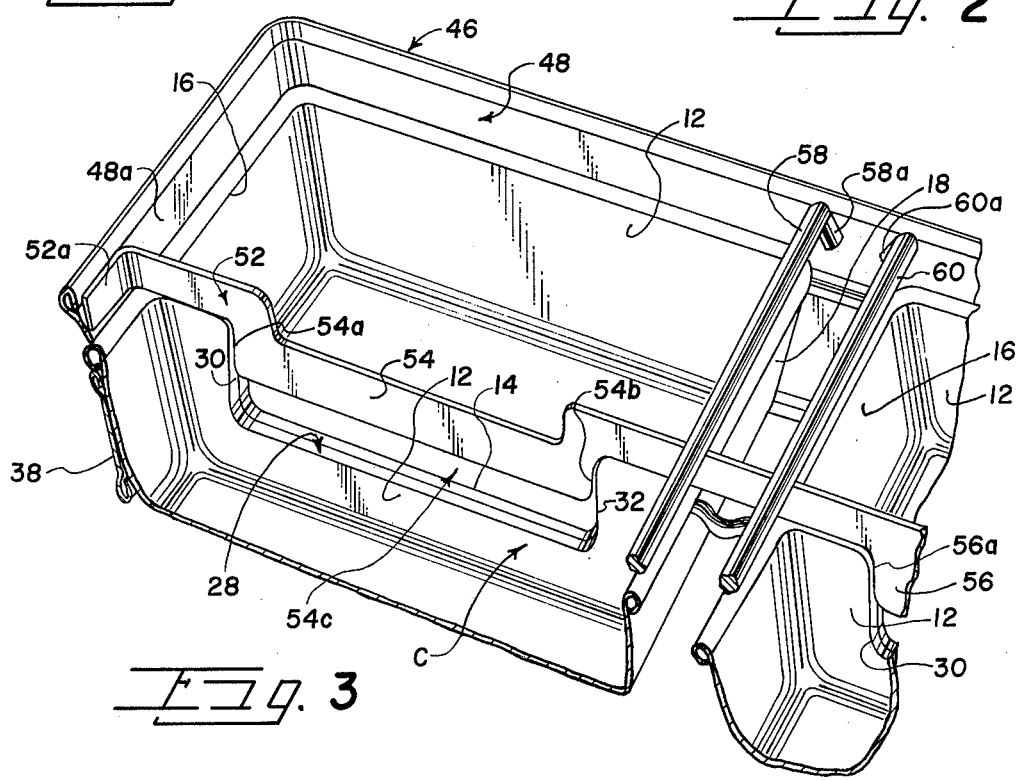
FIG. 3 is a cross-sectional perspective view showing a typical lid and bread pan divider wall.

As best illustrated in FIGS. 3 and 8, a lid 46 is formed, comprising a band 48 of heat resistant material such as metal arranged to disengageably slip over the upper edges of the loaf pans 10 and is reinforced at the corners by L-shaped members 50 as best illustrated in FIG. 8. Divider or spacer members 52 are rigidly secured transversely between sides 48a and 48b by deflected ends 52a, secured thereto as by welding, as best illustrated in FIGS. 2 and 3. Each divider 52 is aligned over partitions A, B and C and has downwardly extending depending portions 54 and 56 having edges 54a and 54b and 56a and 56b adapted to engage with the upper ends of edges 30 and 32 of recess 28 to space the lower edge of the divider 52 from the upper edge of slots 28. It should be readily apparent from the foregoing that downwardly extending depending portions 54 and 56 extend only part way into recesses 28 thereby forming a space or passage 54c between the disengageable lid member 46 and sidewalls 12 and 14.

Support rods 58 and 60 have deflected ends 58a and 60a rigidly secured to upper band member 48 and are secured to each divider 52 to support the divider 52 midway of the length thereof.

It should be readily apparent that if a single width loaf pan 10 is constructed only a single downwardly extending ear would be necessary on divider 52. It should also be readily apparent that the lid 46 and pan 10 may be extended to join any number of sectioned pans.

Operation of the hereinabove described device is as follows:

Dough for making bread is placed in each of the baking compartments or pan sections 20, 22, 24 and 26 and lid member 46 is placed thereover such that a divider 52 is aligned with each divider wall A, B and C of each pan 10 and the divider 52 penetrates the dough but leaves spaces 54c through which the dough is joined. The pan is then placed in an oven and allowed to bake in accordance with the usual procedures of baking bread.

When the dough rises the bread will be joined through the passages 54c formed between the downwardly extending depending portions 54 and 56 on divider 52 and the recesses 28 in each divider wall A, B and C, forming a single loaf of bread the size of each loaf pan 10 joined by integral webs.

In the preferred embodiment four miniature loaves will be formed in a single loaf pan 10. The miniature loaves, when separated, will have crusted edges except for the joinder portion which extends through the passage 54c between the sections 20–26. The bread will crust adjacent the divider 52 and the lower web 34 of the adjoining walls 12 and 14.

When the bread has been fully baked and removed from the oven, the lid 46 is disengaged from the upper portion of the loaf pans 10 and the bread therein is dumped out to cool, forming a single loaf of bread weighing a predetermined amount, such as sixteen ounces, but which is separable by tearing apart the small web therebetween without damage to the adjoining loaves.

From the foregoing it should be readily apparent that the embodiment hereinbefore described accomplishes the objects of the invention hereinbefore discussed.

It should be appreciated that other and further embodiments of the invention may be devised without departing from the basic concept thereof.

Having hereinbefore described our invention, we claim:

1. In a device for baking bread: a pan having end walls transversely disposed between sidewalls joined by a bottom; spaced divider walls each having a recess on the upper edge thereof, said divider walls being secured to the bottom and the sidewalls, dividing said pan into a plurality of sections; a top removably disposed on the pan; a plurality of spacers depending from the top, each spacer having a downwardly extending portion aligned with one of the divider walls and arranged to enter one of the recesses, said downwardly extending portions being spaced from the bottom of the recesses to form a passage between each section.

2. The combination called for in claim 1 with the addition of a plurality of said pans; and means to secure said pans together.

3. The combination called for in claim 1 wherein there are four divider walls forming four sections.

4. The combination called for in claim 2 wherein the means to secure said pans together comprises: a band of heat resistant material; and means to secure said band to the outer periphery of said plurality of pans.

5. The combination called for in claim 1 wherein the top comprises: a frame of heat resistant material adapted to disengageably slide over the outer upper edges of said pan; and means securing the ends of each spacer transversely across said frame in spaced relation over each divider wall.

6. A device for baking bread comprising: a loaf pan having end walls and sidewalls joined by a bottom; a plurality of divider walls rigidly secured between said sidewalls forming a plurality of baking sections in said pan, each said divider wall having a recess formed therein on the upper side thereof; a cover frame adapted to disengageably slide over the outer edges of said loaf pan; a plurality of spaced divider members secured transversely across the frame, each divider member having a downwardly extending portion thereon arranged to enter one of the recesses; the lower edge of each downwardly extending portion being spaced from the bottom of the recess to form passages between the baking sections to form a joinder between miniature loaves of bread baked in the sections.

7. In a baking device, a pan; a plurality of partitions in the pan forming a plurality of baking compartments therein, each said partition having a recess formed in the upper edge thereof; a frame positionable over the pan and disengageably suspended to the edges of the pan; a plurality of dividers attached to the frame in coinciding relationship to the partitions, each divider having a depending portion extending into one of the recesses and terminating short of the bottom of the recess to provide a passage between the baking compartments.

8. In a baking device; a plurality of baking sections joined together; a plurality of baking compartments in each section; transverse walls between the compartments each having a recess in the upper side thereof; a divider suspended over the compartments having depending portions thereon arranged to enter the recesses said depending portions being spaced from the bottoms of the recesses to form passages therethrough allowing communication between the compartments to provide an integral pull-apart joinder between miniature loaves of bread baked in said compartments.

9. The combination called for in claim 8 wherein the dividers are suspended to a frame detachably suspended to the edges of the baking sections.

10. A bread baking pan comprising: a plurality of partition segments spaced transversely across the pan to form a plurality of baking compartments; and means detachably secured said partition segments together such that partitions are formed between baking compartments, said partitions having passages extending therethrough between the segments intermediate opposite ends of said partition and intermediate upper and lower sides of said partitions such that dough in the compartments is connected through said passages.

11. A device for baking bread comprising: a pan; a plurality of divider walls secured to the bottom of said pan in horizontally spaced relation to form baking compartments; a plurality of spacers; and means securing said spacers over said divider walls to form a partition; said spacers being spaced from said divider walls to form passages between said compartments such that dough in the compartments is joined through the passages.

12. In a device for baking bread: a generally rectangular shaped pan having end walls transversely disposed between sidewalls, said end walls and sidewalls being joined by a bottom; spaced upwardly extending divider walls transversely secured to the bottom of said pan to form generally rectangular shaped baking compartments in said pan, each said divider wall having a recess formed on the upper edge thereof spaced from opposite ends of the divider wall; spacer members; means to detachably secure a spacer member over each of said divider walls to form a partition between each baking compartment; each spacer member having a downwardly extending portion spaced from the ends thereof and extending into a recess on a divider wall, said downwardly extending portion being spaced from the bottom of said recess to form a passage in the partition between the baking compartment to allow dough from each compartment to join through the passage.

13. The combination called for in claim 12 wherein the means to detachably secure said spacer members comprises: a rectangular shaped band slidably disposed over the outer, upper periphery of the pan; and means to secure the spacer members to said band over the divider walls.

* * * * *